United States Patent
Yamada (10) Patent No.: US 9,848,050 B2
(45) Date of Patent: Dec. 19, 2017

(54) INFORMATION PROCESSING DEVICE FOR PACKET AND HEADER INSPECTION

(71) Applicant: EVRIKA INC., Tokyo (JP)

(72) Inventor: Naoki Yamada, Tokyo (JP)

(73) Assignee: EVRIKA INC., Tokyo (JP)

( * ) Notice: Subject to any disclaimer, the term of this patent is extended or adjusted under 35 U.S.C. 154(b) by 0 days.

(21) Appl. No.: 15/052,066

(22) Filed: Feb. 24, 2016

(65) Prior Publication Data

US 2016/0255176 A1 Sep. 1, 2016

(30) Foreign Application Priority Data

Feb. 27, 2015 (JP) ................................. 2015-039596

(51) Int. Cl.
*H04L 29/08* (2006.01)
*H04L 29/06* (2006.01)

(52) U.S. Cl.
CPC ........ *H04L 67/145* (2013.01); *H04L 63/1408* (2013.01)

(58) Field of Classification Search
CPC ............................ H04L 69/22; H04L 47/2483
USPC .... 370/392, 395.32, 389, 474, 400; 709/231
See application file for complete search history.

(56) References Cited

U.S. PATENT DOCUMENTS

| 8,432,919 | B2 * | 4/2013 | Seren ................... | G06N 99/005 370/395.3 |
| 8,755,381 | B2 * | 6/2014 | Hughes ................ | H04L 45/745 370/392 |
| 2007/0047457 | A1 | 3/2007 | Harijono et al. | |
| 2010/0162382 | A1 * | 6/2010 | Kim ..................... | H04L 63/1425 726/13 |
| 2010/0217886 | A1 * | 8/2010 | Seren ................... | G06N 99/005 709/231 |
| 2010/0232438 | A1 * | 9/2010 | Bajpai .................... | H04L 69/16 370/400 |
| 2011/0206064 | A1 * | 8/2011 | Head ........................ | H04L 69/12 370/474 |
| 2011/0302656 | A1 * | 12/2011 | El-Moussa .......... | H04L 63/1425 726/24 |
| 2012/0159109 | A1 * | 6/2012 | Gerber ................ | G06F 12/0223 711/170 |
| 2013/0034100 | A1 * | 2/2013 | Goyal ....................... | G06N 5/02 370/392 |

FOREIGN PATENT DOCUMENTS

JP 2001-256045 A 9/2001
JP 2009-510815 A 3/2009

* cited by examiner

*Primary Examiner* — Edan Orgad
*Assistant Examiner* — Saumit Shah
(74) *Attorney, Agent, or Firm* — Westerman, Hattori, Daniels & Adrian, LLP (57) ABSTRACT

Provided is an information processing device including: a data acquiring unit which acquires data which flows through a network and includes a header and content, before the data reaches a destination; an inspecting unit which inspects the content; a during-inspection transmitting unit which transmits at least a part of the data to the destination while an inspection by the inspecting unit is being performed; and a transferring unit which, after the inspection of the content by the inspecting unit is completed, transfers the data including the content with the exception of a portion already transmitted by the during-inspection transmitting unit, to the destination.

14 Claims, 6 Drawing Sheets

INFORMATION PROCESSING DEVICE FOR PACKET AND HEADER INSPECTION

CROSS-REFERENCE TO RELATED APPLICATION

This application is based upon and claims the benefit of priority of the prior Japanese Patent Application No. JP2015-039596, filed on Feb. 27, 2015, the entire contents of which are incorporated herein by reference.

FIELD

The present disclosure relates to a technique for inspecting data on a network.

BACKGROUND

Conventionally, as a method of inspecting a data packet stream on a computer network in order to search for a pattern divided by a border of a data packet, there are proposed methods involving determining whether or not two or more data packets are consecutive in a data packet stream, joining payloads from consecutive data packets, analyzing the joined payloads from the consecutive data packets, and searching for a plurality of patterns constituted by combinations of characters as well as a method involving returning a data packet to an output data stream based on predetermined determination criteria when the data packet is present in a system for a predetermined time or longer (refer to Japanese Translation of PCT Application No. 2009-510815).

In addition, conventionally, there are proposed, in a zone center station connected to a group center station accommodating a plurality of subscriber terminals connected to the Internet, a storage device which temporarily stores packet data transferred to and from the Internet for each user ID of the subscriber terminals and a gateway provided with functions for assembling a plurality of pieces of packet data stored in the storage device into file data by associating each piece of packet data with an IP address in the Internet and with a local IP address in a network, determining whether or not a computer virus exists in the assembled data, and transferring data in which a computer virus is determined not to exist to the subscriber terminals (refer to Japanese Patent Application Publication No. 2001-256045).

SUMMARY

An example of the present disclosure is an information processing device including: data acquiring means for acquiring data which flows through a network and includes a header and content, before the data reaches a destination; inspecting means for inspecting the content; during-inspection transmitting means for transmitting at least a part of the data to the destination while an inspection by the inspecting means is being performed; and transferring means for, after the inspection of the content by the inspecting means is completed, transferring the data including the content with the exception of a portion already transmitted by the during-inspection transmitting means, to the destination.

The present disclosure may be viewed as an information processing device, a system, a method that is executed by a computer, and a program to be executed by a computer.

In addition, the present disclosure may be viewed as a recording of such a program on a recording medium that is readable by a device such as a computer, a machine, or the like.

In this case, a recording medium that is readable by a computer or the like refers to a recording medium which stores information such as data and programs by an electric action, a magnetic action, an optical action, a mechanical action, or a chemical action and which can be read by a computer or the like.

DESCRIPTION OF EMBODIMENTS

Hereinafter, an embodiment of an information processing device, a method, and a program according to the present disclosure will be described with reference to the drawings.

It should be noted that the embodiment described below merely exemplifies the present disclosure and is not intended to limit an information processing device, a method, and a program according to the present disclosure to the specific configuration described below. When implementing the present disclosure, a specific configuration may be adopted as appropriate in accordance with each embodiment. In addition, various improvements and modification may be made to the present disclosure.

As the present embodiment, an embodiment in which an information processing device, a method, and a program according to the present disclosure are implemented in a communication inspection device will be described. However, the information processing device, the method, and the program according to the present disclosure can be widely used with respect to techniques for inspecting data on a network. Accordingly, objects of application of the present disclosure are not limited to the examples described in the present embodiment.

<Configuration of System>

Figure 1:
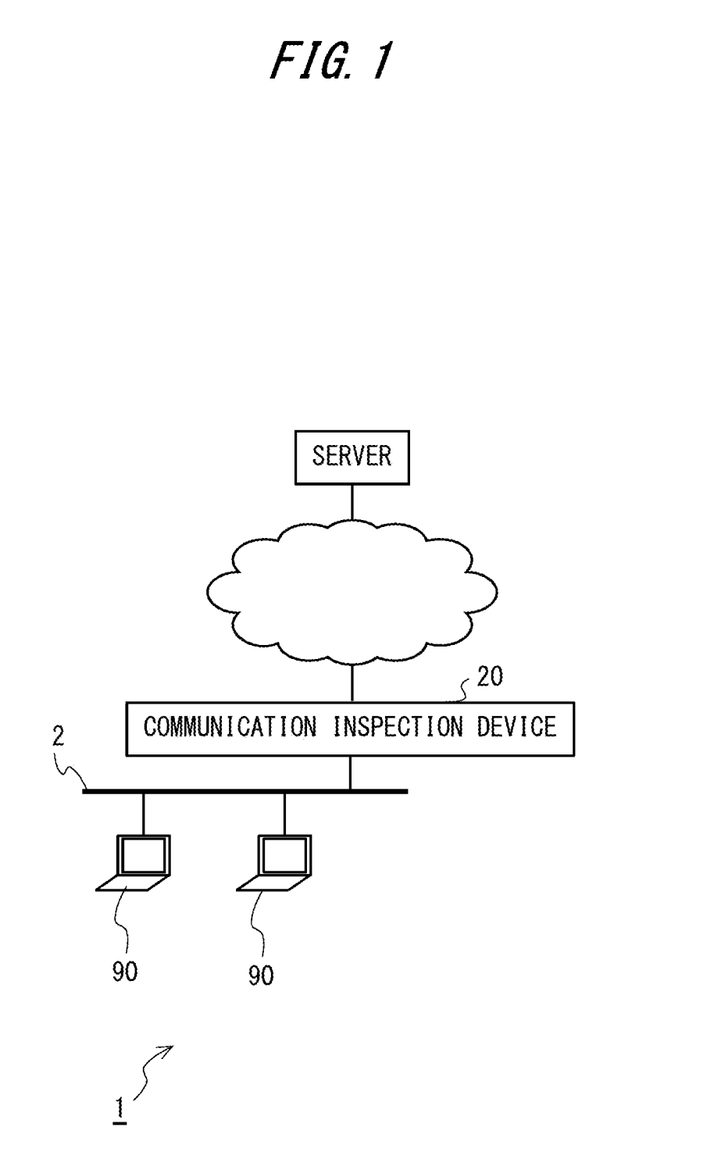
FIG. 1 is a schematic diagram showing a configuration of a system according to an embodiment.

FIG. 1 is a schematic diagram showing a configuration of a system 1 according to the present embodiment. The system 1 according to the present embodiment includes a network segment 2 to which a plurality of information processing terminals 90 (hereinafter, referred to as "clients 90") are connected and a communication inspection device 20 for relaying communication related to the clients 90. In addition, the clients 90 in the network segment 2 are capable of communicating, via the communication inspection device 20, with various servers connected at remote locations via the Internet or wide area networks. In the present embodiment, the communication inspection device 20 acquires packets passing through the communication inspection device 20 by being connected between the client 90 and the Internet in the network segment 2. Furthermore, the communication inspection device 20 transfers packets which are not subjects of an inspection and packets which are determined to be transferrable as a result of the inspection among the acquired packets.

Figure 2:
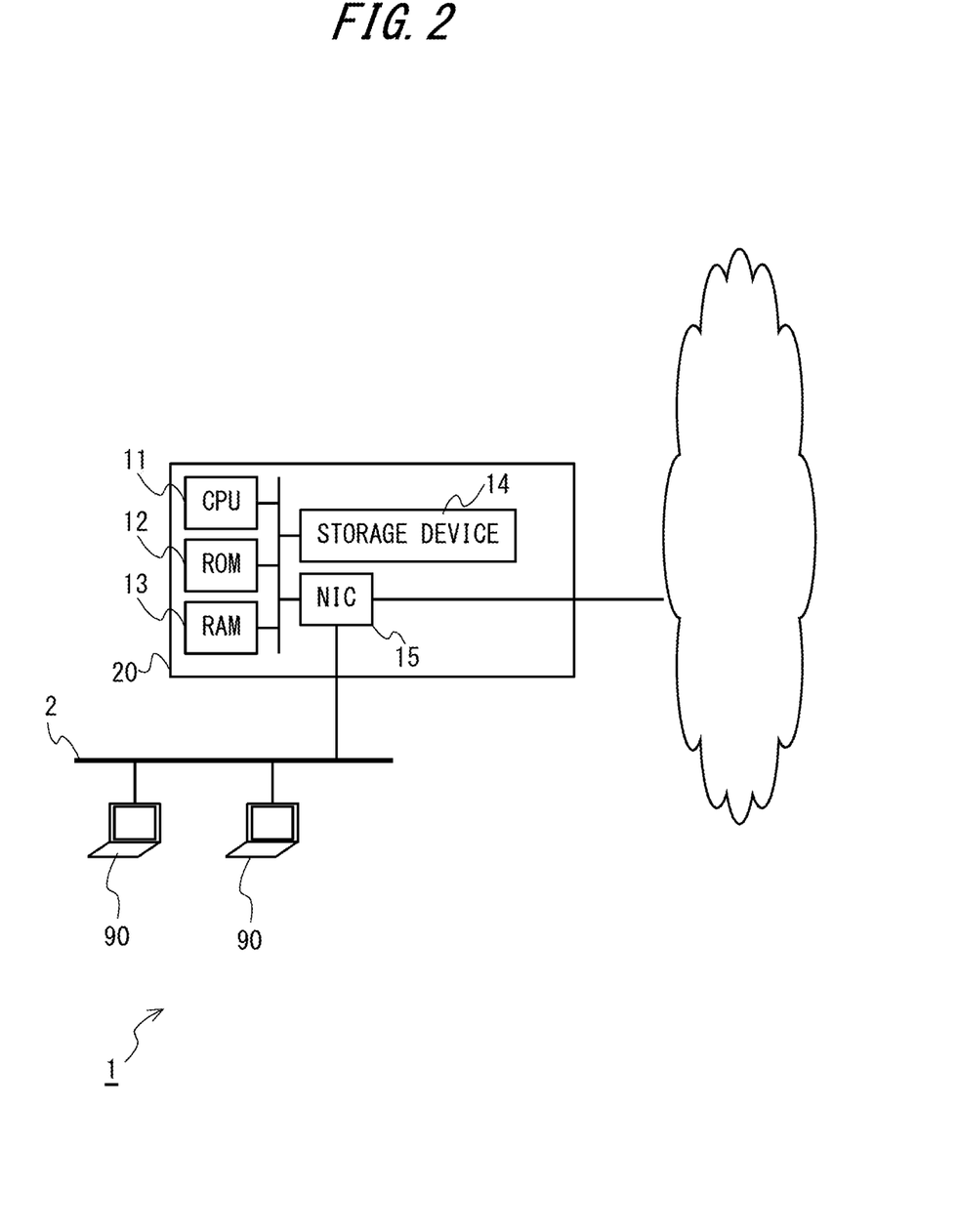
FIG. 2 is a diagram showing a hardware configuration of a communication inspection device according to an embodiment.

FIG. 2 is a diagram showing a hardware configuration of the communication inspection device 20 according to the present embodiment. The communication inspection device 20 is a computer including a central processing unit (CPU) 11, a read only memory (ROM) 12, a random access memory (RAM) 13, a storage device 14 such as an electrically erasable and programmable read only memory (EEPROM) or a hard disk drive (HDD), a communicating unit such as a network interface card (NIC) 15, and the like. However, omissions, replacements, and additions may be performed as appropriate according to each embodiment in a specific hardware configuration of the communication inspection device 20. In addition, the communication inspection device 20 is not limited to a single device. The communication inspection device 20 may be realized by a plurality of devices using techniques such as so-called cloud computing and distributed computing.

Figure 3:
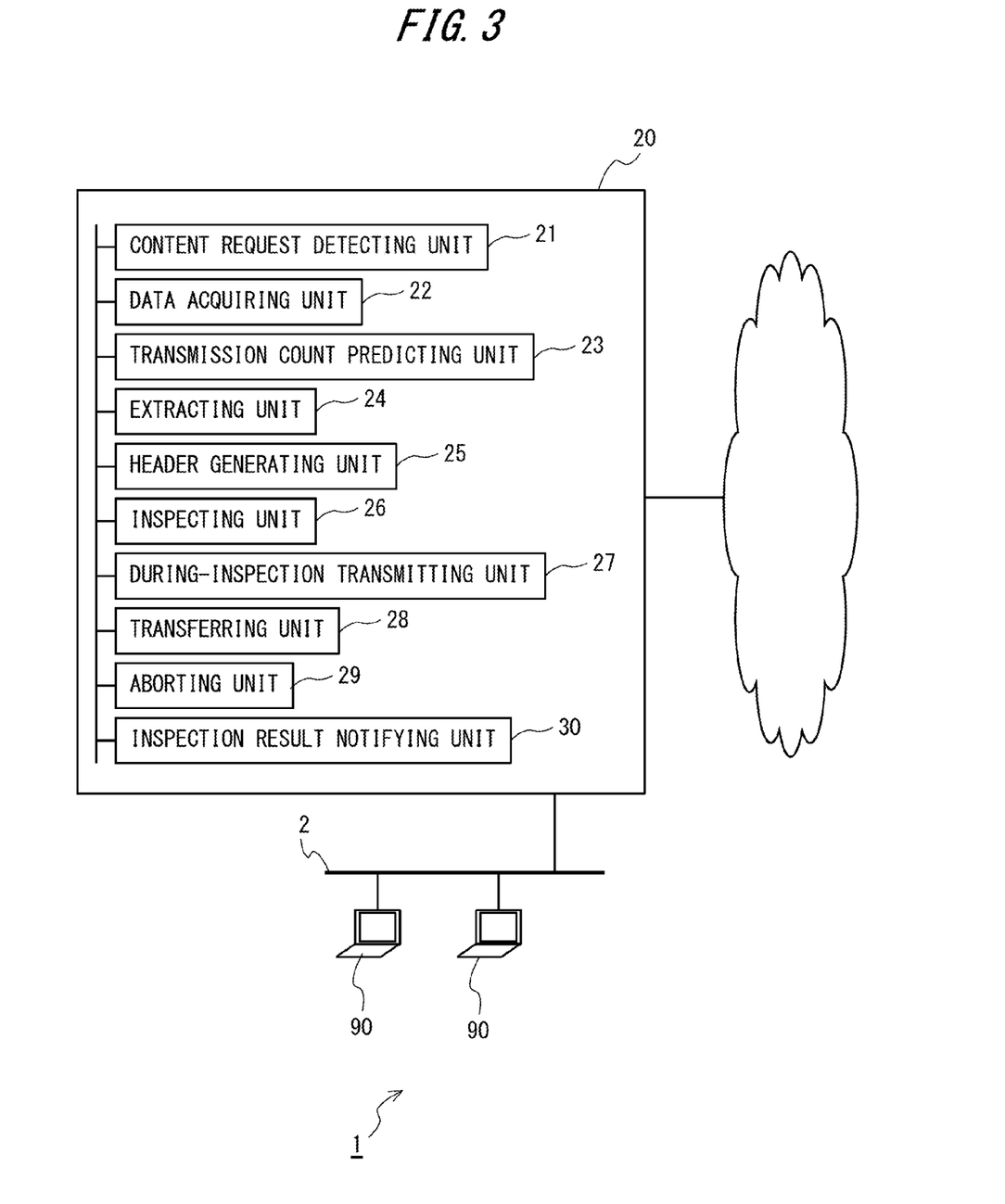
FIG. 3 is a diagram schematically showing a functional configuration of a communication inspection device according to an embodiment.

FIG. 3 is a diagram schematically showing a functional configuration of the communication inspection device 20 according to the present embodiment. As a program recorded on the storage device 14 is read into the RAM 13 and executed by the CPU 11, the communication inspection device 20 functions as an information processing device including a content request detecting unit 21, a data acquiring unit 22, a transmission count predicting unit 23, an extracting unit 24, a header generating unit 25, an inspecting unit 26, a during-inspection transmitting unit 27, a transferring unit 28, an aborting unit 29, and an inspection result notifying unit 30. Moreover, in the present embodiment, the respective functions of the communication inspection device 20 are executed by the CPU 11 that is a general purpose processor. Alternatively, a part of or all of the functions may be executed by one or a plurality of dedicated processors. In addition, a part of or all of the functions may be executed by a device installed at a remote location or by a plurality of devices installed in a distributed manner using cloud technology or the like.

The content request detecting unit 21 detects a content request (a connection request) in which at least any of a transmission source, a destination, and a request content type satisfies predetermined conditions.

The data acquiring unit 22 acquires data which is related to communication that is transmitted and received by a terminal connected to a network and which includes a header and content, before the data reaches a destination. Moreover, in the present embodiment, in addition to communication by the client 90 connected to the network segment 2, the communication inspection device 20 can set all communication via the communication inspection device 20 as inspection subjects.

The transmission count predicting unit 23 predicts an inspection time necessary for an inspection of content acquired by the data acquiring unit 22 and, based on the predicted inspection time, predicts a count of transmissions by the during-inspection transmitting unit 27.

The extracting unit 24 extracts a header by which content to be received by the destination is not determined (fixed), from the header included in data acquired by the data acquiring unit 22.

The header generating unit 25 generates a header by which content to be received by the destination is not determined.

The inspecting unit 26 inspects whether or not content acquired by the data acquiring unit 22 is content whose transfer to a destination set in the data is permitted in accordance with inspection items set in advance. For example, the inspecting unit 26 inspects whether or not the content includes malware, whether or not the content includes undesirable expressions, and the like. However, specific inspection items and inspection methods adoptable by the inspection according to the present disclosure are not limited to the examples described in the present embodiment. Various inspection items and inspection methods which are either known or expected to be developed in the future may be adopted as the specific inspection items and inspection methods.

The during-inspection transmitting unit 27 transmits at least a part of the header included in the data to the destination of the data at intervals that prevent a reception wait time of the data at the destination from timing out while an inspection by the inspecting unit 26 is being performed. Moreover, while a header is transmitted as data to be transmitted in order to prevent timeout (running out of a reception wait time) in the present embodiment, data to be transmitted in order to prevent timeout is not limited to a header. Data to be transmitted in order to prevent timeout may be data which does not determine (fix) a type, a size, or the like of subsequent data to be received by the client 90.

When an inspection of content by the inspecting unit 26 is completed and an inspection result indicates that the content is content whose transfer to a destination is permitted, the transferring unit 28 transfers the data including the content with the exception of the portion already transmitted by the during-inspection transmitting unit 27, to the destination of the data.

When a result of an inspection by the inspecting unit 26 indicates that the content is not content whose transfer to the destination of the data is permitted, the aborting unit 29 aborts the transfer by the transferring unit 28.

When a result of the inspection by the inspecting unit 26 indicates that the content is not content whose transfer to the destination of the data is permitted, the inspection result notifying unit 30 transmits, to the destination of the data, information for notifying the destination of the inspection result as a part of data successive to the portion already transmitted by the during-inspection transmitting unit 27.

<Flow of Processes>

Next, a flow of processes executed by the system 1 according to the present embodiment will be described with reference to flow charts. It is to be understood that specific contents and sequences of the processes shown in the flow charts described below merely represent one example of implementing the present disclosure. Specific contents and sequences of the processes may be appropriately selected in accordance with embodiments of the present disclosure.

Figure 4:
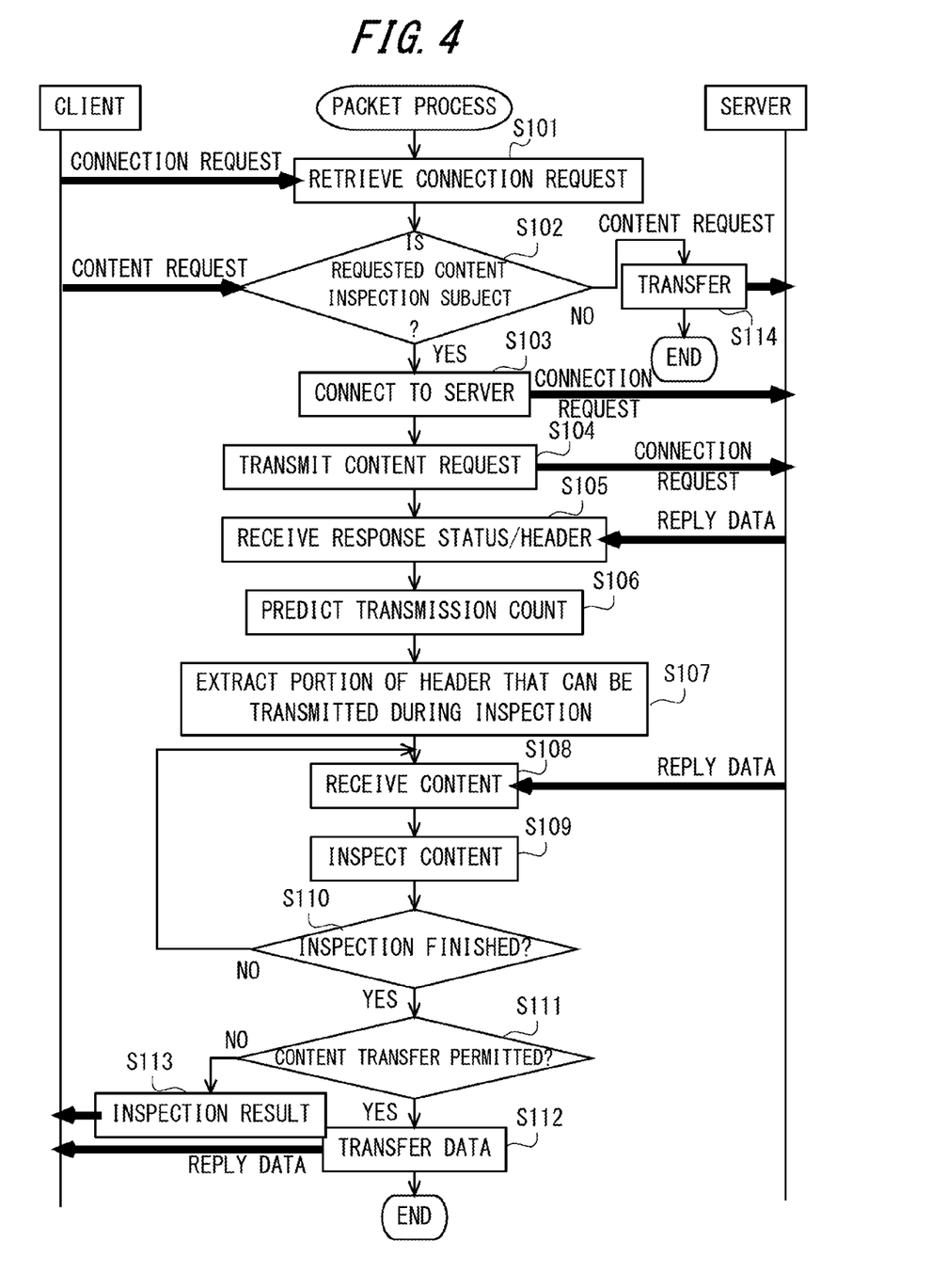
FIG. 4 is a flow chart showing an outline of a flow of a packet process according to an embodiment.

FIG. 4 is a flow chart showing an outline of a flow of a packet process according to the present embodiment. Execution of the packet process according to the present embodiment is triggered by the reception of a connection request packet (for example, a SYN packet of TCP) flowing on the network by the communication inspection device 20.

In step S101, a connection request is retrieved. The content request detecting unit 21 refers to a transmission source and a destination set in the header of a received packet, determines whether or not the packet is a subject of retrieval (for example, a connection request packet from the client 90 to a server), retrieves a packet that is a subject of retrieval, and stores the packet in the RAM 13 (a so-called hook process). Packets determined not to be a retrieval subject are transferred to the destination (not shown) without being retrieved by the communication inspection device 20.

Whether or not a packet is a retrieval subject is determined by collating to check whether or not a transmission source and a destination of the packet are registered in a list of transmission source IP addresses and destination IP addresses set in advance. The list used for the collation may either be a white list or a black list. In addition, a method that differs from that of the present disclosure may be adopted for determining whether or not a packet is a subject of retrieval. Subsequently, the process proceeds to step S102.

In step S102, a determination is made on whether or not content related to the request by the client 90 is to be set as an inspection subject. The content request detecting unit 21 receives a packet belonging to a connection related to the connection request retrieved in step S101 and refers to a request line and a header of the packet to determine whether or not the packet is a packet requesting content of a predetermined type that is an inspection subject of the inspecting unit 26. Whether or not the packet is a packet requesting inspection subject content is determined by collating to check whether or not the request line and the header of the packet matches or approximates information registered in an inspection subject list set in advance.

For example, when an HTTP packet has a request line and a header described below, the packet is determined to be a packet requesting inspection subject content.
GET/HTTP/1.1
Host: sample.site
Accept: */*
User-Agent: UserAgent 1.0
Accept-Language: ja
Accept-Encoding: gzip, deflate
Connection: keep-alive When it is determined that the packet is not a packet requesting inspection subject content, the content requested by the packet are not set as an inspection subject, the packet is transferred (step S114), and the process shown in the present flow chart is finished. On the other hand, when it is determined that the packet is a packet requesting inspection subject content, the content requested by the packet is set as a subject of an inspection performed in step S109 (to be described later), and the process proceeds to step S103.

In steps S103 and S104, a connection request and a content request are transmitted. The communication inspection device 20 is connected to a server related to the connection request in step S101 and requests content related to the content request in step S102 to the server. In doing so, the communication inspection device 20 may transfer the packet received in steps S101 and S102 to the server without modification or may transmit the packet to the server after performing address translation on a transmission source IP address as necessary. Subsequently, the process proceeds to step S105.

In step S105, a packet including a response status and/or a header is received. The data acquiring unit 22 acquires data which is transmitted from the server as a reply packet to the content request packet transmitted in step S104 and which includes a response status and/or a header before the data reaches the client 90. In this case, when data is transmitted by being divided into a plurality of packets, the data acquiring unit 22 acquires data including a response status and/or a header by assembling the plurality of packets. In addition, the communication inspection device 20 refers to the contents of the header to determine whether or not content successive to the header is to be set as an inspection subject of the inspecting unit 26. This determination is made by, for example, collating a type of content as specified from the contents of the header with a list of types of content to be set as an inspection subject (or not to be set as an inspection subject). Alternatively, the determination may be made by comparing a size of the content as specified from the contents of the header with an upper limit of sizes to be set as inspection subjects.

For example, when HTTP data has a response status and a header described below, successive content is determined to be an inspection subject.
HTTP/1.1 200 OK
Server: Apache
Date: xxxxxxxx GMT
Content-Type: application/octet-stream
Content-Length: 108
Connection: keep-alive
Cache-Control: max-age=0, no-cache
Pragma: no-cache As a result of the determination, when the content is determined not to be set as an inspection subject, a connection related to the packet is set not to be an inspection subject and the process shown in the present flow chart is finished (not shown). On the other hand, when the content is set as an inspection subject, the process proceeds to step S106.

In step S106, a transmission count in a header transmitting process (to be described later) is predicted. The transmission count predicting unit 23 predicts an inspection time necessary for inspecting the content by discerning a size of the content by referring to the header of the packet received in step S105 and then dividing the size by processing capabilities (for example, a data size that can be inspected per predetermined time) of the inspecting unit 26. Subsequently, the transmission count predicting unit 23 predicts a transmission count by dividing the predicted inspection time by a transmission interval of the during-inspection transmitting unit 27. In this case, as the transmission interval of the during-inspection transmitting unit 27, an interval that prevents a reception wait time of a packet related to the content from timing out at the client 90 to receive the content is set in advance. Subsequently, the process proceeds to step S107.

In step S107, a portion of the header that can be transmitted during an inspection is extracted. The extracting unit 24 extracts a header portion by which content to be received by the destination is not determined, from the header received in step S105. In other words, the extracting unit 24 extracts a header by which content to be received by the destination is not determined by excluding a header portion that causes an inconvenience (for example, contradictory data sizes or contradictory content types) in processing of the data at the destination if data (for example, an inspection result) other than data transmitted from the server is transmitted to the destination as a part of data that is successive to the portion already transmitted by the during-inspection transmitting unit 27.

For example, the portion shown below is a header portion which limits a type and a size of content and which limits data that can be subsequently transmitted, of the header exemplified in the description of step S105.
Content-Type: application/octet-stream
Content-Length: 108
Therefore, the extracting unit 24 extracts a portion excluding the header portion described above as a header by which the content is not determined (fixed).

Moreover, while a case where hypertext transfer protocol (HTTP) is used in transmitting and receiving content is described as an example in the present embodiment, the present disclosure can also be applied to other protocols. For example, when the protocol used to transmit and receive content is post office protocol version 3 (POP3), since a From field, a To field, a Cc field, a Subject field, and the like in the header constitute a header which limits a type and a size of content, the extracting unit 24 extracts a header excluding these portions.

In addition, the extracting unit 24 may extract a header by which content to be received by the destination is not determined, from the header included in data acquired by the data acquiring unit 22, by an amount determined in accordance with the transmission count predicted in step S106. Specifically, the extracting unit 24 may extract a header portion by an amount that can be transmitted when divided by the transmission count predicted in step S106. Moreover, when the amount of a header portion that can be extracted is less than an amount corresponding to the transmission count, the extracting unit 24 extracts all header portions by which the content is not determined (fixed). Subsequently, the process proceeds to step S108.

In steps S108 to S110, the content is received and the received content is inspected. The data acquiring unit 22 acquires data which is transmitted from the server as a reply packet to the content request packet transmitted in step S104 and which includes the content (step S108). In addition, the data acquiring unit 22 acquires the data including the content, before the data reaches the client 90, and defers transfer to the destination client 90 until an inspection of the content included in the data is completed. Furthermore, while transfer of the data is being deferred, the inspecting unit 26 inspects whether or not the acquired content is content whose transfer to the client 90 is permitted in accordance with inspection items set in advance (step S109). When data is transmitted by being divided into a plurality of packets, the inspecting unit 26 sequentially inspects portions already received while assembling a packet every time each of the plurality of packets is acquired by the data acquiring unit 22. Once inspection of the entire content is finished (step S110), the process proceeds to step S111.

Moreover, while the reception and the inspection of the content are being performed from steps S108 to S110, the communication inspection device 20 executes the header transmitting process in order to prevent a reception wait time at the client 90 from timing out. Details of the header transmitting process will be described with reference to FIG. 5.

In step S111, an inspection result is determined. As a result of the inspection in steps S108 to S110, when it is determined that the content is content whose transfer to the client 90 is permitted, the process proceeds to step S112. On the other hand, when it is determined that the content is content whose transfer to the client 90 is not permitted, the process proceeds to step S113.

In step S112, the data is transferred. The transferring unit 28 transfers (transmits) data excluding the portion already transmitted by the during-inspection transmitting unit 27 in the header transmitting process (to be described later) of the data including the content to the client 90 that is the destination of the data. Subsequently, the process shown in the present flow chart is finished.

In step S113, transfer of data is aborted and inspection result information is transmitted. When the result of the inspection by the inspecting unit 26 indicates that the content is content whose transfer to the destination of the data is not permitted, the aborting unit 29 aborts the transfer by the transferring unit 28. Therefore, with the system according to the present embodiment, undesirable content can be prevented from being inadvertently transmitted to the client 90. In addition, the inspection result notifying unit 30 transmits, to the destination of the data, information for notifying the destination of the inspection result as a part (a header, content, and the like) of data successive to the portion already transmitted by the during-inspection transmitting unit 27. Specifically, the inspection result notifying unit 30 generates content (for example, a web page) for notifying a user of the client 90 that the content requested by the client 90 contains malware, undesirable expressions, or the like and a header suitable for the content (for example, a header that limits a type and a size of the content), and transmits the generated content and header to the client 90. Subsequently, the process shown in the present flow chart is finished.

Figure 5:
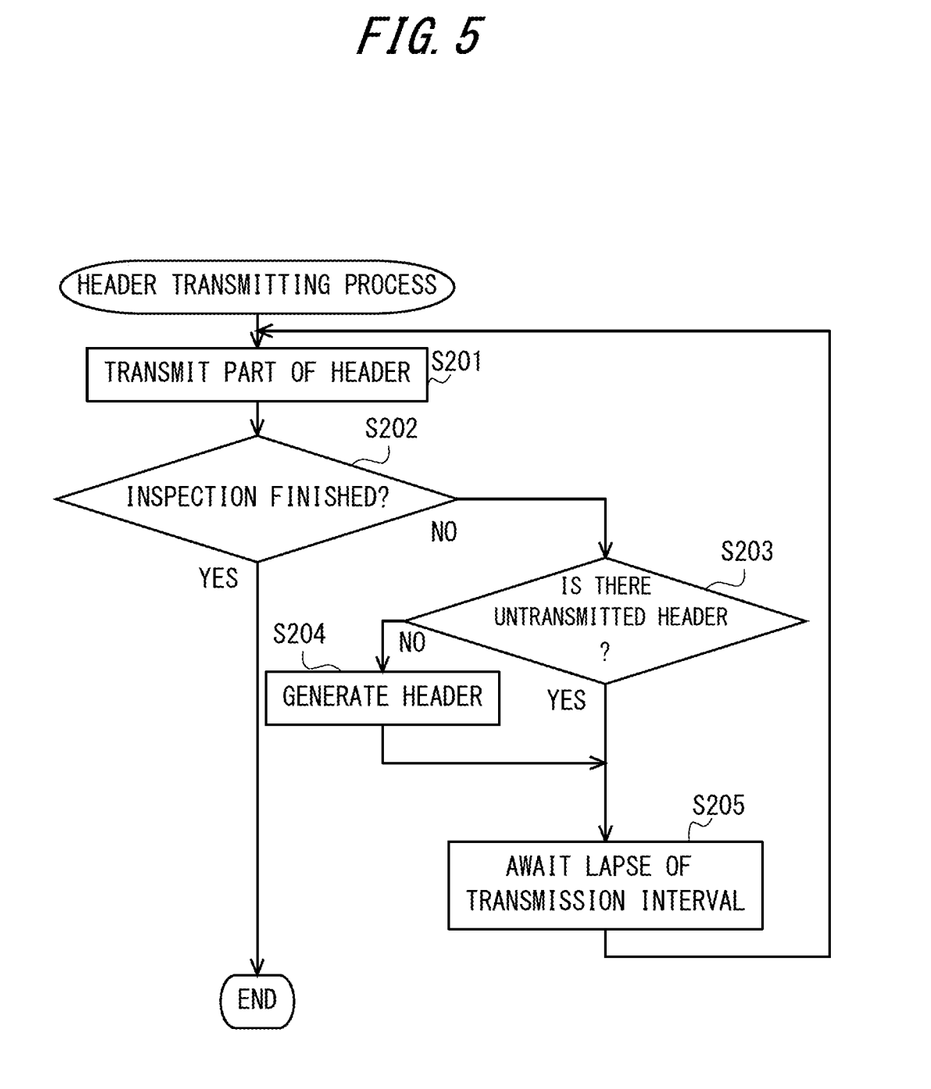
FIG. 5 is a flow chart showing an outline of a flow of a header transmitting process according to an embodiment.

FIG. 5 is a flow chart showing an outline of a flow of a header transmitting process according to the present embodiment. Execution of the header transmitting process according to the present embodiment is triggered by a start of content inspection described in steps S108 to S110 in the packet process shown in FIG. 4.

In step S201, a part of a header is transmitted. The during-inspection transmitting unit 27 transmits at least a part of the header included in the data to the client 90 that is the destination of the data. Moreover, while a part of a header extracted by the extracting unit 24 or a header generated by the header generating unit 25 is used as the data to be transmitted in order to prevent timeout in the present embodiment, data to be transmitted in order to prevent timeout is not limited to a header. Data to be transmitted in order to prevent timeout may be data which does not determine (fix) a type, a size, or the like of subsequent data to be received by the client 90. Subsequently, the process proceeds to step S202.

In step S202, a determination is made on whether or not the inspection has been finished. The during-inspection transmitting unit 27 determines whether or not the content inspection described in steps S108 to S110 of the packet process described earlier has been finished. When it is determined that the content inspection has not been finished, the process proceeds to step S203. On the other hand, when it is determined that the content inspection has been finished, the process shown in the present flow chart is finished. Moreover, while whether or not to continue the header transmitting process is determined by checking whether or not the content inspection by the inspecting unit 26 has been finished in the present embodiment, a determination to continue/finish the header transmitting process may be made based on whether or not the inspection time (calculated in step S106) has lapsed from the start of the inspection.

In steps S203 and S204, a timeout prevention header is generated when there is no untransmitted header. When all headers extracted in step S107 have been transmitted to the client 90 and there are no more headers that can be transmitted (NO in step S203), the header generating unit 25 generates a timeout prevention header (step S204). The header generated at this point is a header by which content to be received by the destination is not determined in a similar manner to the header extracted in step S107. In addition, as the header by which content to be received by the destination is not determined, the header generating unit 25 may generate, for example, an original header whose name begins with "X-".

Moreover, while the header generating unit 25 is configured to generate a timeout prevention header and transmit the timeout prevention header to the during-inspection transmitting unit 27 when there are no more extracted headers in the present embodiment, instead of this configuration, a configuration may be adopted in which the during-inspection transmitting unit 27 gradually transmits a portion other than the header of the data received from the server (for example, a portion whose transmission to the client 90 is permitted).

In step S205, a lapse of a transmission interval is awaited. The during-inspection transmitting unit 27 waits for a transmission interval set in advance to lapse. As described earlier, as the transmission interval, an interval that prevents a reception wait time of a packet related to the content from timing out at the client 90 to receive the content is set in advance. Once the transmission interval lapses, the process proceeds to step S201 and a part of the rest of the header is transmitted (step S201). In other words, with the system according to the present embodiment, the during-inspection transmitting unit 27 transmits, one part at a time, the header included in the data to the destination of the data at intervals that prevent a reception wait time of the data at the destination from timing out while an inspection by the inspecting unit 26 is being performed.

Figure 6:
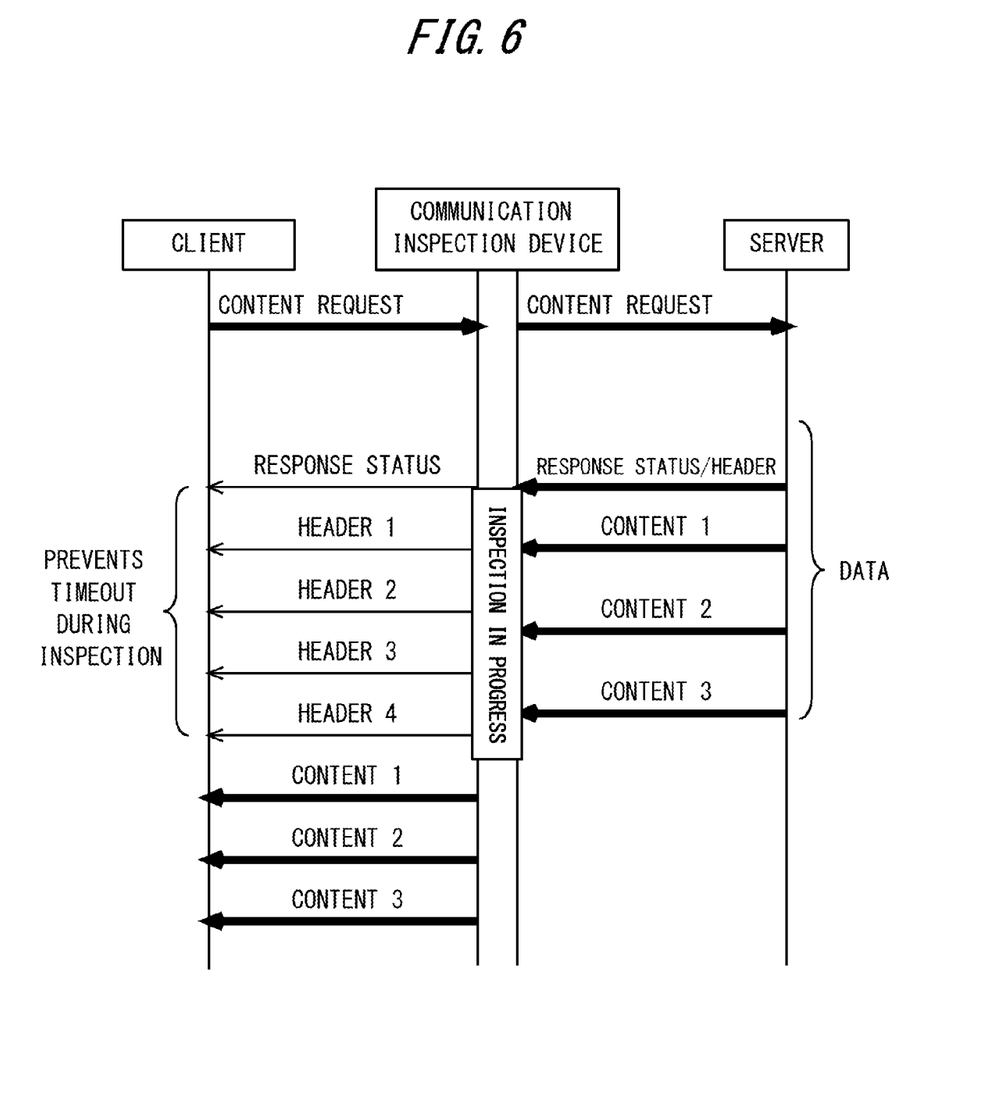
FIG. 6 is a diagram showing a flow of a packet when a packet process and a header transmitting process are executed in an embodiment.

FIG. 6 is a diagram showing a flow of a packet when a packet process and a header transmitting process are executed in the present embodiment. With the information processing device, the method, and the program according to the present embodiment, a timeout during content inspection can be prevented by transmitting, in a divided manner to the client 90, a portion (a header or the like) by which the content is not determined (fixed) in data transmitted from a server in response to a content request while the data is being inspected by the communication inspection device 20.

Moreover, conventionally, although a technique for preventing a timeout at lower layers such as the transmission control protocol (TCP) layer by transmitting an empty packet at each prescribed time is sometimes used as a technique for preventing a reception wait time from timing out (for example, keep-alive in TCP), this technique is unable to prevent a timeout in the application layer. According to the information processing device, the method, and the program described in the present embodiment, a timeout in the application layer can be prevented in addition to preventing timeouts in lower layers such as the TCP layer.

In addition, with the information processing device, the method, and the program according to the present embodiment, the client 90 can be kept from receiving the content until an inspection of the entire content is finished without causing a timeout of the reception wait time at the client 90. Furthermore, when inappropriate content is detected, a notification can be made to a user as reply data with respect to a content request by the client 90 without having to use a dedicated application or the like.

What is claimed is:

1. An information processing device comprising:
   processing circuitry configured to operate as:
   a data acquiring unit to acquire data which flows through a network and includes a content and a header as a metadata of the content, before the data reaches a destination;
   an inspecting unit to inspect the content;
   an extracting unit to extract a part of the header by which content is not determined, from the header included in the data acquired by the data acquiring unit;
   a during-inspection transmitting unit to transmit the part extracted by the extracting unit to the destination in a manner of dividing and transmitting in multiple times while an inspection by the inspecting unit is being performed; and
   a transferring unit to, after the inspection of the content by the inspecting unit is completed, transfer the data including the content with the exception of a portion already transmitted by the during-inspection transmitting unit, to the destination.

2. The information processing device according to claim 1, wherein
   the during-inspection transmitting unit transmits at least a part of the data to the destination at intervals that prevent a reception wait time of the data at the destination from timing out.

3. The information processing device according to claim 1, wherein the processing circuitry is further configured to operate as a transmission count predicting unit to predict an inspection time necessary for inspecting content acquired by the data acquiring unit and to predict a transmission count by the during-inspection transmitting unit based on the predicted inspection time, wherein
   the extracting unit extracts a part of the header by which content is not determined, from the header included in data acquired by the data acquiring unit, by an amount determined based on the predicted transmission count.

4. The information processing device according to claim 1, wherein
   the inspecting unit inspects whether or not the content is content whose transfer to the destination is permitted, and
   the transferring unit transfers the data including the content with the exception of the portion already transmitted by the during-inspection transmitting unit, to the destination when a result of an inspection by the inspecting unit indicates that the content is content whose transfer to the destination is permitted.

5. The information processing device according to claim 4, wherein the processing circuitry is further configured to operate as an aborting unit to abort transfer by the transferring unit when the result of the inspection by the inspecting unit indicates that the content is not content whose transfer to the destination is permitted.

6. The information processing device according to claim 5, wherein the processing circuitry is further configured to operate as an inspection result notifying unit to transmit, to the destination, information for notifying the destination of the inspection result as a part of data successive to the portion already transmitted by the during-inspection transmitting unit, when the result of the inspection by the inspecting unit indicates that the content is not content whose transfer to the destination of the data is permitted.

7. The information processing device according to claim 6, wherein
   the data includes a header as a metadata of the content, and
   the inspection result notifying unit transmits, to the destination, information for notifying the destination of the inspection result as at least any of a header and content which are successive to the portion already transmitted by the during-inspection transmitting unit.

8. The information processing device according to claim 1, wherein
   the data includes a header as a metadata of the content, and
   the during-inspection transmitting unit transmits at least a part of a header included in the data to the destination while an inspection by the inspecting unit is being performed.

9. The information processing device according to claim 1, wherein
   the data includes a header as a metadata of the content, and the processing circuitry is further configured to operate as a header generating unit to generate a header by which content not determined, wherein the during-inspection transmitting unit further transmits the header generated by the header generating unit.

10. The information processing device according to claim 1, wherein the processing circuitry is further configured to operate as a content request detecting unit to detect a content request in which at least any of a transmission source, a destination, and a type of requested content matches predetermined conditions, wherein the data acquiring unit acquires data including content transmitted in accordance with the content request detected by the content request detecting unit.

11. The information processing device according to claim 1, wherein the data is transmitted by being divided into a plurality of packets, and the data acquiring unit acquires the data by assembling the plurality of packets.

12. The information processing device according to claim 1, wherein the data acquiring unit acquires the data before the data reaches the destination, and defers transfer to the destination until an inspection of the content included in the data is completed.

13. A method for causing a computer to execute:

acquiring data which flows through a network and includes a content and a header as a metadata of the content, before the data reaches a destination;

inspecting the content;

extracting a part of the header by which content is not determined, from the header included in the data acquired by the acquiring;

transmitting the part extracted by the extracting to the destination in a manner of dividing and transmitting in multiple times while an inspection in the inspecting is being performed; and transferring, after the inspection of the content in the inspecting is completed, the data including the content with the exception of a portion already transmitted in the during-inspection transmitting, to the destination.

14. A computer-readable non-transitory medium on which is recorded a program causing a computer to function as:

a data acquiring unit to acquire data which flows through a network and includes a content and a header as a metadata of the content, before the data reaches a destination;

an inspecting unit to inspect the content;

an extracting unit to extract a part of the header by which content to be received by the destination is not determined, from the header included in the data acquired by the data acquiring unit;

a during-inspection transmitting unit to transmit the part extracted by the extracting unit to the destination in a manner of dividing and transmitting in multiple times while an inspection by the inspecting unit is being performed; and a transferring unit to, after the inspection of the content by the inspecting unit is completed, transfer the data including the content with the exception of a portion already transmitted by the during-inspection transmitting unit, to the destination.

* * * * *

UNITED STATES PATENT AND TRADEMARK OFFICE
CERTIFICATE OF CORRECTION

PATENT NO. : 9,848,050 B2
APPLICATION NO. : 15/052066
DATED : December 19, 2017
INVENTOR(S) : Naoki Yamada Page 1 of 1

It is certified that error appears in the above-identified patent and that said Letters Patent is hereby corrected as shown below:

In the Claims

Column 12 Line 20:
Change:
"content to be received by the destination is not"
To be:
--content is not--

Signed and Sealed this
Twenty-fourth Day of July, 2018

Andrei Iancu
*Director of the United States Patent and Trademark Office*